(12) United States Patent
Jung (10) Patent No.: US 10,915,156 B2
(45) Date of Patent: *Feb. 9, 2021

(54) WEARABLE DEVICE-AWARE SUPERVISED POWER MANAGEMENT FOR MOBILE PLATFORMS

(71) Applicant: Avago Technologies International Sales Pte. Limited

(72) Inventor: Hwisung Jung, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,888

(22) Filed: Dec. 6, 2018

(65) Prior Publication Data

US 2019/0107880 A1 Apr. 11, 2019

Related U.S. Application Data

(63) Continuation of application No. 14/039,645, filed on Sep. 27, 2013, now Pat. No. 10,175,739.

(Continued)

(51) Int. Cl.
| | |
|---|---|
| *G06F 1/00* | (2006.01) |
| *G06F 1/3234* | (2019.01) |
| *G06F 1/3228* | (2019.01) |
| *G06F 1/324* | (2019.01) |
| *G06F 1/3296* | (2019.01) |

(Continued)

(52) U.S. Cl.
CPC ............ *G06F 1/3234* (2013.01); *G06F 1/324* (2013.01); *G06F 1/3228* (2013.01); *G06F 1/3296* (2013.01); *G06F 9/4893* (2013.01); *H04W 52/0254* (2013.01); *H04W 52/0258* (2013.01);

(Continued)

(58) Field of Classification Search
CPC ...... G06F 1/3228; G06F 2217/78; G06F 1/32; G06F 1/3234; G06F 1/324; G06F 1/3296; G06F 9/4893; H04W 52/0254; H04W 52/0258; H04W 52/223; Y02D 10/00; Y02D 10/126; Y02D 10/172; Y02D 10/24;

(Continued)

(56) References Cited

U.S. PATENT DOCUMENTS

| | | |
|---|---|---|
| 9,286,568 B2 | 3/2016 | Rhines et al. |
| 9,588,568 B2 * | 3/2017 | Kim ...................... G06F 1/3287 |

(Continued)

*Primary Examiner* — Zhipeng Wang
(74) *Attorney, Agent, or Firm* — Morgan, Lewis & Bockius LLP (57) ABSTRACT

Methods, systems, and computer program products are provided for supervised power management between a primary platform and a secondary platform. Communication between a primary platform and a secondary platform is established. An application running on the secondary platform is captured. Input features and output measures are collected to build a training set for the application, wherein the input features are collected through direct measurement and the output measures reflect characteristics of the application. Based on the training set, power consumption of the secondary platform with an expected performance level is predicted for a new application running on the secondary platform. Accordingly, an optimal power management policy is derived that minimizes the total power consumption of the primary and secondary platforms.

20 Claims, 7 Drawing Sheets

Related U.S. Application Data (60) Provisional application No. 61/877,851, filed on Sep. 13, 2013, provisional application No. 61/757,947, filed on Jan. 29, 2013.

(51) Int. Cl.
*H04W 52/22* (2009.01)
*H04W 52/02* (2009.01)
*G06F 9/48* (2006.01)

(52) U.S. Cl.
CPC .......... *H04W 52/223* (2013.01); *Y02D 10/00* (2018.01); *Y02D 30/70* (2020.08)

(58) Field of Classification Search
CPC .... Y02D 30/70; Y02D 70/142; Y02D 70/144; Y02D 70/162; Y02D 70/166; Y02D 70/26
See application file for complete search history.

(56) References Cited

U.S. PATENT DOCUMENTS

| | | | |
|---|---|---|---|
| 2005/0060594 A1 | 3/2005 | Barr et al. | |
| 2005/0132238 A1 | 6/2005 | Nanja | |
| 2007/0088522 A1* | 4/2007 | Van Gassel | G11B 19/04 702/127 |
| 2008/0268828 A1 | 10/2008 | Nagaraja | |
| 2009/0006875 A1* | 1/2009 | Varma | G06F 1/3203 713/320 |
| 2009/0228725 A1 | 9/2009 | Carroll | |
| 2010/0245585 A1* | 9/2010 | Fisher | G06K 9/0061 348/164 |
| 2011/0010567 A1* | 1/2011 | Schmitz | G06F 1/3296 713/300 |
| 2011/0137829 A1 | 6/2011 | Wilson et al. | |
| 2011/0145920 A1 | 6/2011 | Mahaffey et al. | |
| 2011/0264938 A1* | 10/2011 | Henroid | G06F 1/3296 713/323 |
| 2011/0320836 A1 | 12/2011 | Johnston et al. | |
| 2012/0110351 A1* | 5/2012 | Raju | G06F 1/3203 713/300 |
| 2013/0046967 A1 | 2/2013 | Fullerton et al. | |
| 2013/0122804 A1* | 5/2013 | Narendra | H04W 52/0277 455/41.1 |
| 2013/0124436 A1 | 5/2013 | Cardenas Mora et al. | |
| 2013/0139170 A1 | 5/2013 | Prabhakar et al. | |
| 2013/0174128 A1* | 7/2013 | Kansal | G06F 11/3457 717/135 |
| 2013/0332142 A1 | 12/2013 | Lerner et al. | |
| 2014/0215242 A1 | 7/2014 | Jung | |
| 2014/0330764 A1* | 11/2014 | Rhines | G06N 5/02 706/46 |

* cited by examiner

Example of collecting input features and output measures

| Input features | | Output measure | |
|---|---|---|---|
| Util (%) | FPS | Power (mW) | DataRate (mbps) |
| Med | High | P3 | D3 |
| Med | Med | P2 | D3 |
| Low | Med | P1 | D1 |
| Med | High | P2 | D2 |
| Med | Med | P2 | D2 |
| Med | Med | P2 | D3 |
| Med | Low | P1 | D1 |
| High | High | P3 | D2 |

WEARABLE DEVICE-AWARE SUPERVISED POWER MANAGEMENT FOR MOBILE PLATFORMS

CROSS-REFERENCE TO RELATED APPLICATIONS

This application is a continuation of U.S. patent application Ser. No. 14/039,645, filed Sep. 27, 2013, now U.S. Pat. No. 10,175,739, which claims priority to U.S. Provisional Application No. 61/757,947, filed Jan. 29, 2013, and U.S. Provisional Application No. 61/877,851, filed Sep. 13, 2013, all of which are incorporated by reference herein in their entireties.

BACKGROUND

The development of wearable technology is a response to the need of ubiquitous computing. Many companies have rolled out wearable devices, with functionalities ranging from sleep habit monitoring and calorie counts, notifications for emails, phone calls and text messages, voice activation and facial recognition, games, to photo manipulation and sharing to social networks. Wearable devices constitute a secondary mobile platform that communicate seamlessly to the cloud via a primary platform in a short range.

The primary platform may be a smartphone or a tablet computer. The secondary platform may be a wearable device such as a smart watch, smart glass or other small wearable consumer electronics and embedded devices. Existing systems do not have a workload or environment-aware power management policy for the secondary platform, especially to take into consideration that the primary and secondary platforms have different battery source and power management policies. Given that the behavior of power consumption of the secondary platform is frequently affected by the primary platform, such conventional systems do not have coordinated power management between the primary and secondary platforms. Accordingly, they fail to optimize the primary and secondary power management policies effectively to extend battery life to provide an ideal user experience.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the relevant art to make and use the disclosure.

The embodiments will be described in detail with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present disclosure refers to the accompanying drawings that illustrate exemplary embodiments consistent with this disclosure. Other embodiments are possible, and modifications can be made to the embodiments within the spirit and scope of the disclosure. Therefore, the detailed description is not meant to be limiting. Rather, the scope of the disclosure is defined by the appended claims.

As will be described in further detail below, embodiments can implement a coordinated power management policy that considers battery charge or drain on both primary and secondary platforms, when determining DVFS (Dynamic Voltage Frequency Scaling) parameters for a specific application to be run on the secondary platform, such as a wearable device.

As will be described in further detail below, embodiments can generate a training set based on the collection of the input features and output measures of existing applications running on the secondary platform. Embodiments can further classify the training set into various categories representing a range of values for the output measures, such as a power consumption level and data rate. Embodiments can provide a tool to predict the optimal power management policy that strikes a balance between the trade-off of performance and power usage on both platforms. Embodiments can further adjust the DVFS parameters for a new application to be run on the secondary platform that minimizes power consumption on both platforms.

In one embodiment, the present disclosure relates to a system having a memory configured to store modules. The modules include a communication module configured to establish communication between a primary platform and a secondary platform, an application capturing module configured to capture an application running on the secondary platform, an collecting module configured to collect input features and output measures as a training set for the application, wherein the input features are collected through direct measurement and the output measures reflect characteristics of the application, and a power predicting module configured to predict power consumption of the secondary platform with an expected performance level for a new application running on the secondary platform based on the training set. A processor, coupled to the memory, is configured to process the modules.

According to a further embodiment of the disclosure, there is provided a method including establishing communication between a primary platform and a secondary platform, capturing an application running on the secondary platform, collecting input features and output measures as a training set for the application, wherein the input features are collected through direct measurement and the output measures reflect characteristics of the application, and predicting power consumption of the secondary platform with an expected performance level for a new application running on the secondary platform based on the training set.

Additional embodiments of the disclosure include a computer-readable storage device having instructions stored thereon, execution of which, by a computing device, causes the computing device to perform operations comprising establishing communication between a primary platform and a secondary platform, capturing an application running on the secondary platform, collecting input features and output measures as a training set for the application, wherein the input features are collected through direct measurement and the output measures reflect characteristics of the application, and predicting power consumption of the secondary platform with an expected performance level for a new application running on the secondary platform based on the training set.

Reference to modules in this specification and the claims means any combination of hardware, software, or firmware components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

Further features and advantages of the disclosure, as well as the structure and operation of various embodiments of the disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

II. A Supervised Power Management System

Figure 1:
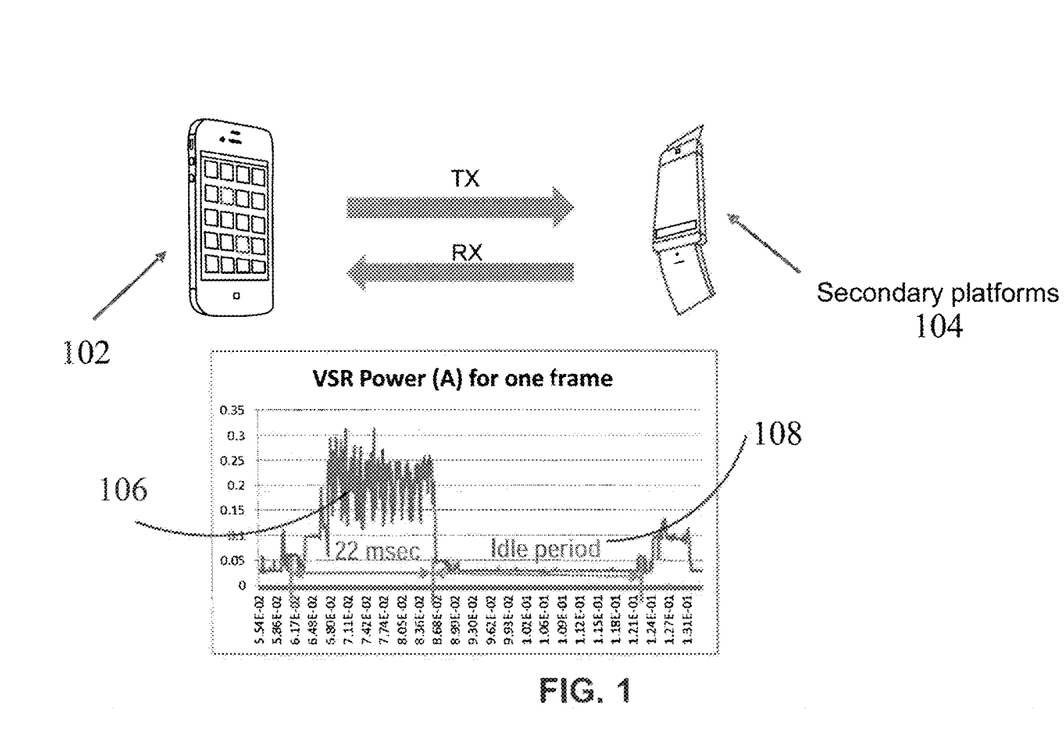
FIG. 1 illustrates an exemplary power consumption scheme between a primary and secondary platform, according to an embodiment of the present disclosure.

FIG. 1 illustrates an exemplary power consumption scheme between a primary and secondary platform, according to an embodiment of the present disclosure. FIG. 1 shows power consumption between a primary platform 102, and a secondary platform 104, running a 3D video playback application. For example, primary platform 102 may be a smart phone or a tablet computer. In one embodiment, secondary platform 104 may be a wearable device such as a smart watch, smart glass or other consumer electronics and embedded devices. Alternatively, secondary platform 104 does not need to be a wearable device.

According to an embodiment, the wearable device on secondary platform 104 communicates with primary platform 102 via short-ranged wireless technologies such as Bluetooth, WirelessHD, Wireless Home Digital Interface (WHDI), Wi-Fi, cellular, infrared, radio-frequency identification (RFID), near-field communication (NFC), ZigBee, Z-ware, and etc. Primary platform 102 and secondary platform 104 may have different battery sources and power management policies.

In one embodiment, in the event that no wearable device is detected in the vicinity of primary platform 102, primary platform 102 implements a legacy or standalone power management policy. In another embodiment, if the wearable device is detected in the vicinity of primary platform 104, two power management policies for primary platform 102 and secondary platform 104 may be taken into consideration and a supervised power management policy may be enabled.

A supervised power management policy may control power management of secondary platform. For example, a Dynamic Voltage and Frequency Scaling (DVFS) or power-gating mechanism may be implemented for video/audio streaming on secondary platform 104. Alternatively, a supervised power management policy may adjust legacy power management policy on primary platform 102, such as implementing a feedback based control for primary platform 102. For example, if a user on secondary platform does not select HD video clips, primary platform 102 may send video to secondary platform 104 in a relatively low frame frequency.

In the example of FIG. 1, upon detecting the presence of a wearable device, primary platform 102, such as a smart phone may enable the supervised power management. In one embodiment, workload may be captured and defined as a data rate ratio of transmission rate (Tx) and receiving rate (Rx) between primary platform 102 and secondary platform 104. One skilled in the relevant arts will appreciate that other parameters may be used to define workload. In one embodiment, power consumption on secondary platform 104 may be estimated with expected performance to decide an optimal power management policy between primary and secondary platforms 102 and 104. For example, a Dynamic Frequency Scaling (DFS) may be implemented to adjust the power consumption. Dynamic power consumption is a function of voltage and frequency. Thus, based on the expected performance, the clock frequency on the secondary platform may be changed. High frequency may correspond to high power consumption.

FIG. 1 shows the power consumption of a 3D video playback. Based on the frame size, there is an active period 106 which corresponds to high power consumption and an idle period 108 which corresponds to low power consumption. Accordingly, adjusting the frame size may adjust the power consumption of a 3D video playback application running on secondary platform 104.

Figure 2:
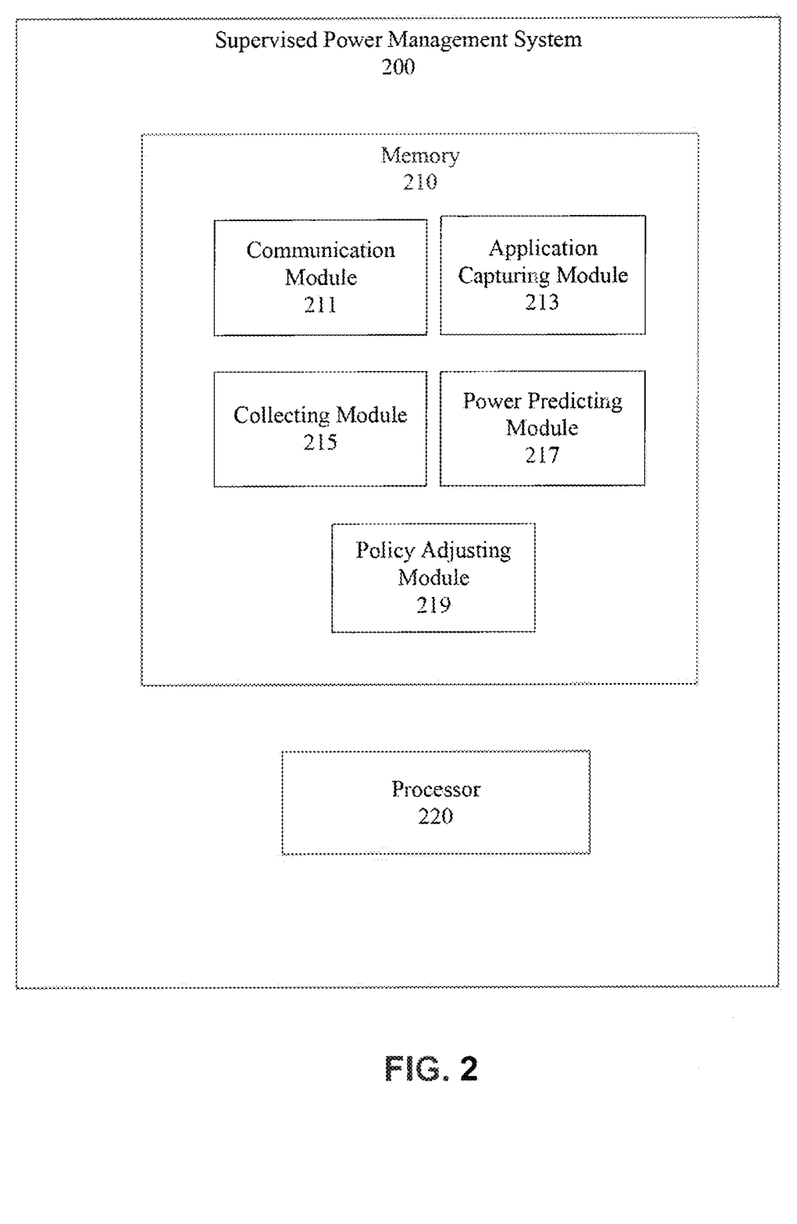
FIG. 2 illustrates elements of an supervised power management system, according to an embodiment of the present disclosure.

FIG. 2 illustrates elements of a supervised power management system, according to an embodiment of the present disclosure. In the example shown in FIG. 2, wearable device-aware supervised power management system 200 includes a memory 210 and processors 220. Memory 210 further includes a communication module 211, an application capturing module 213, a collecting module 215, a power predicting module 217 and a policy adjusting module 219.

Communication module 211 establishes communication between a primary platform and a secondary platform, such as primary platform 102 and secondary platform 104 illustrated in FIG. 1. As noted, the wearable device may establish communication with primary platform via short range communications. In one embodiment, short range wireless communication using Bluetooth may be used to communicate between wireless headsets and audio applications of the wearable device with the primary platform. In another embodiment, short range wireless communication using Wi-Fi may be used to provide image compression between a wearable device with the primary platform. In still another embodiment, short range wireless communication using WirelessHD may be used to conduct video transfer between the wearable device and the primary platform. In still another embodiment, short range wireless communication using Wireless Home Digital Interface (WHDI) may be implemented between game applications on a wearable device communicating with the primary platform.

Application capturing module 213 captures an application running on the secondary module, such as a 3D video playback running on the wearable device illustrated in FIG. 2. In an embodiment, capture an application indicates that an application running on the wearable device is detected and a workload of the detected application is captured. For example, application capturing module 213 may capture workload defined as the Tx/Rx data rate in the 3D video playback application running on the wearable device. Alternatively, application capturing module 213 may capture a MP3 playback application on the wearable device. Still alternatively, application capturing module 213 may capture a voice activation application on the wearable device. Still alternatively, application capturing module 213 may capture a web browser application on the wearable device.

Figure 6:
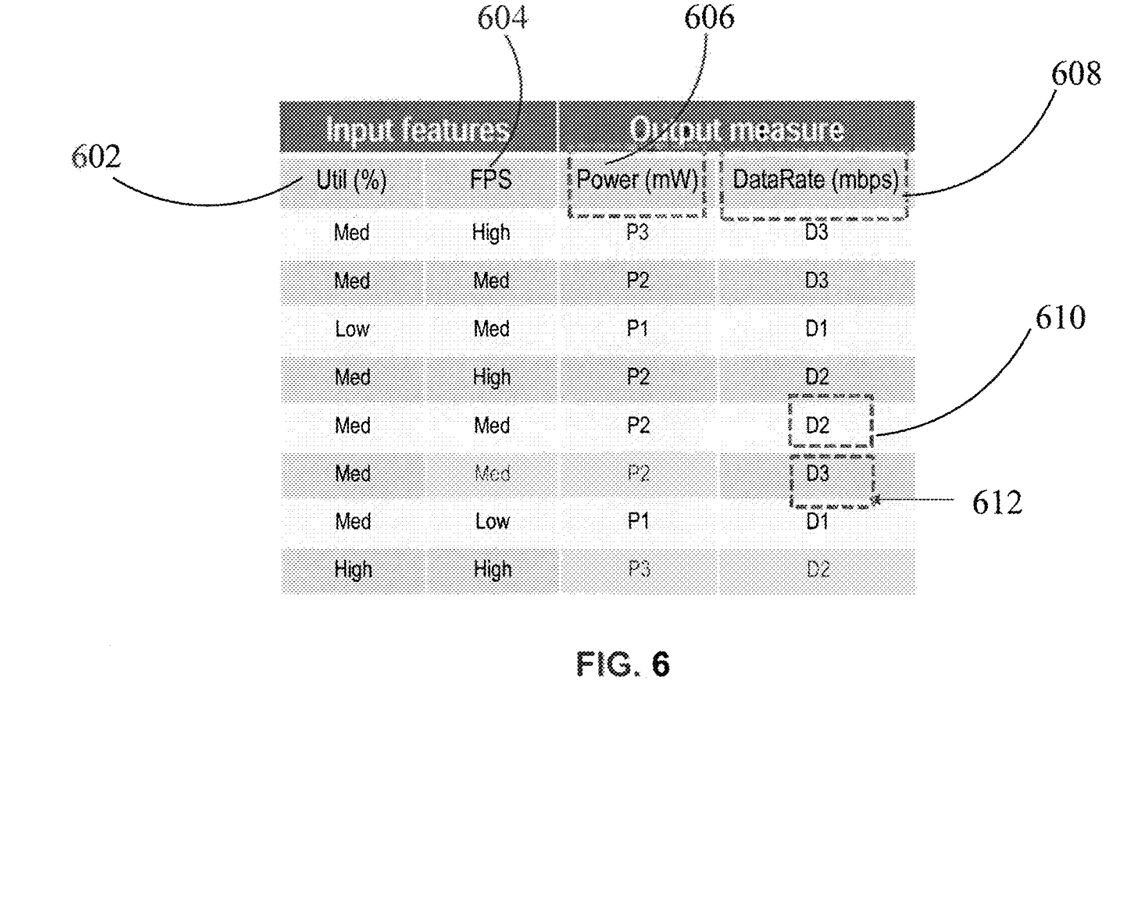
FIG. 6 depicts a classification of input features and output measures, according to another embodiment of the present disclosure.

Collecting module 215 collects input features and output measures as a training set for the captured application, wherein the input features are collected through direct measurement and the output measures reflect characteristics of the captured application. The training set may be organized as a training table as illustrated in FIG. 6.

In the example of a 3D playback application, the input features may include a utilization rate, which is defined as the ratio of the active_period over the total period. The total period is defined as the active_period plus the idle_period. In another example of an imaging application running on a wearable device, the input features may include a frame frequency such as Frame Per Second (FPS).

In an embodiment, output measures may include power consumption on the secondary platform. In another embodiment, output measures may include data rate between the primary platform and the secondary platform. Accordingly, a training set may include parameters such as utilization rate, frame frequency FPS, power consumption and data rate.

Power predicting module 217 predicts power consumption of the secondary platform with an expected performance level for a new application running on the secondary platform based on the training set. In an embodiment, power predicting module 217 predicts upcoming power consumption and performance level of the processor when a new task or application is executed on the secondary platform. In another embodiment, power predicting module 217 predicts the most likely output label of the output measure given an input feature. Given the output measures may be within a range of values rather than a single value in the training table, the output class label indicates the class or category of values that an output measure belongs to. For example, an output measure, such as data rate between the primary platform and the second platform, may be labeled as class D1, D2 and D3, with D1=[10 20] mbps, D2=[20 40] and D3=[40 60]. The output label will be further elaborated in FIG. 6.

Optionally, power predicting module 217 may further include a training set building module configured to build the training set based on a machine learning technique.

Optionally, supervised power management system 200 may include a policy adjusting module 219 which adjusts a power management policy with an optimal clock frequency of the secondary platform that minimizes a total power consumption of the primary platform and the secondary platform.

In an embodiment, the power management policy is adjusted based on:

$$DFS_{new} = \arg\min_{freq1, freq2}(Energy_{primary} + Energy_{secondary})$$
$$= \arg\min_{freq1, freq2}\left[\left(\frac{p_- \cdot t_p + p_+ \cdot t_p}{2}\right) + \left(\frac{func(d_-) \cdot t_s + func(d_+) \cdot t_s}{2}\right)\right]$$

such that $FPS_{secondary}$>user_defined

In the equation listed above, $Energy_{primary}$ and $Energy_{secondary}$ indicate the power consumption level of the primary and the second platform respectively. Thus, $$\arg\min_{freq1, freq2}(Energy_{primary} + Energy_{secondary})$$

represents the minimal combined power consumption of the primary and secondary platforms as a function of the clock frequencies freq 1 and freq2, where freq1 is a clock frequency of the primary platform; freq2 is a clock frequency of the secondary platform; $t_p$ is an active period of the primary platform; $t_s$ is an active period of the secondary platform, assuming prediction of a power consumption range Px=[p−, p+] and a data rate range Dy=[d−, d+] and the power consumption of the secondary platform is estimated as $P\_2^{nd}$=[func(d−), func(d+)].

Optionally, supervised power management system 200 may include a feature classification module configured to categorize a feature y of the secondary platform into a class 1 based on:

$$y_{MAP} = \arg\max_l Prob(y = l | x_1, x_2, \ldots, x_n)$$
$$= \arg\max_l \frac{Prob(x_1, x_2, \ldots, x_n | y = l) \cdot Prob(y = l)}{Prob(x_1, x_2, \ldots, x_n)}$$
$$= \arg\max_l Prob(y = l) \cdot \prod_{j=1}^{l} Prob(x_j | y = l)$$

wherein x1 is a utilization rate, x2 is a frame frequency of the secondary platform, and $y_{map}$ is a maximal probability of assigning class 1 to a output feature y.

In an example of a variation, embodiments of the elements of supervised power management system 200 in FIG. 2, as described herein may be further configured to run in parallel. Such parallel execution of these elements would greatly increase the efficiency and speed of supervised power management system 200.

III. Methods

Figure 3:
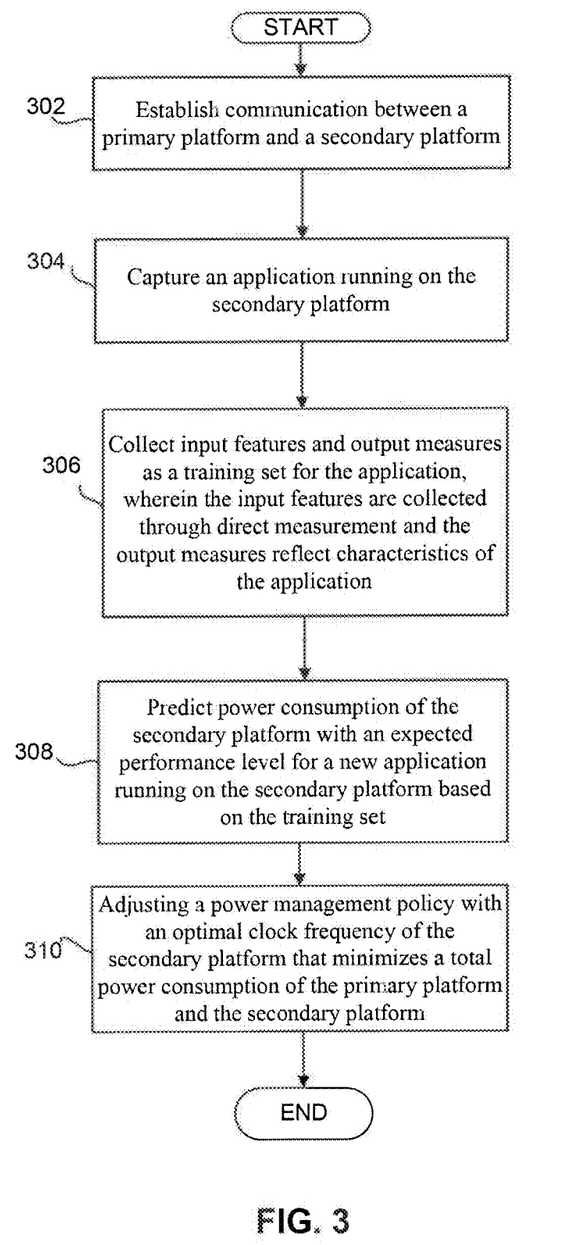
FIG. 3 is a flowchart illustrating a method for supervised power management, in accordance with an embodiment of the present disclosure.

FIG. 3 is a flowchart illustrating a method for supervised power management, in accordance with an embodiment of the present disclosure. For ease of explanation, method 300 will be described with respect to system 200 of FIG. 2, as described above. However, method 300 is not intended to be limited thereto.

At stage 302, communication between a primary platform and a secondary platform is established. For example, communication module 211 establishes communication between a primary platform and a secondary platform. As noted, the communication may encompass short range communication, such as Bluetooth, Wireless HD, WHDI, Wi-Fi, Cellular, Infrared, RFID, NFC, ZigBee, Z-ware and etc. In an embodiment, a sync process may occur between the primary and secondary platforms. The supervised power management may be enabled upon the completion of the sync process.

At stage 304, an application running on the secondary platform is captured. For example, application capturing module 213 captures an application running on the secondary platform. In an embodiment, workload of the captured application may be defined using appropriate parameters such as data rate between the primary and secondary platforms. In another embodiment, workload may affect the power consumption of the secondary platform, which depends on the primary platform as well.

In an embodiment, a user may select to view video clips from, for example, a smart watch, where the video clips are located on the primary platform. The video playback may be enabled on the secondary platform and the video clips may be transferred from the primary platform to the secondary platform. The applications running on the smart watch that stream and display the video clips may be captured.

Figure 4:
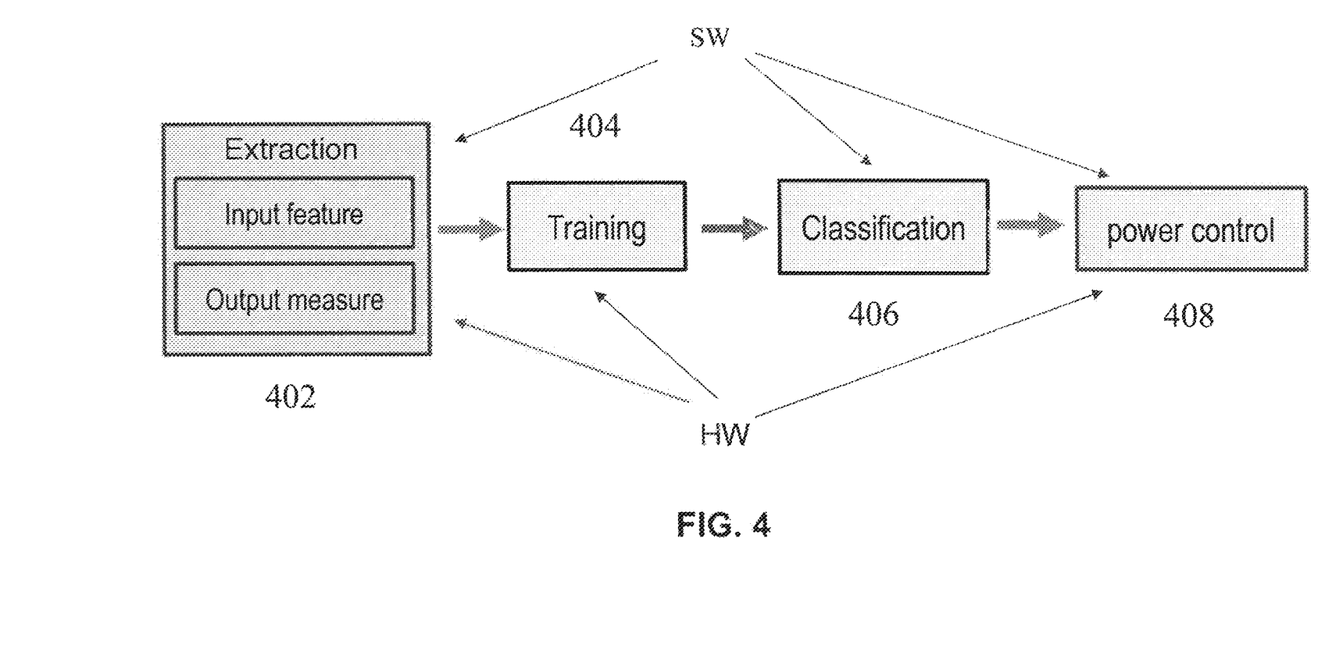
FIG. 4 is a flowchart illustrating stages of the prediction of the upcoming power consumption and performance, in accordance with an embodiment of the present disclosure.

At stage 306, input features and output measures are collected as a training set for the application, wherein the input features are collected through direct measurement and the output measures reflect characteristics of the application. For example, collecting module 215 collects input features and output measures as a training set for the application. FIG. 4 is a flowchart illustrating stages of the prediction of the upcoming power consumption and performance, in accordance with an embodiment of the present disclosure. Stage 306 may correspond to extraction period 402 illustrated in FIG. 4.

Figure 5:
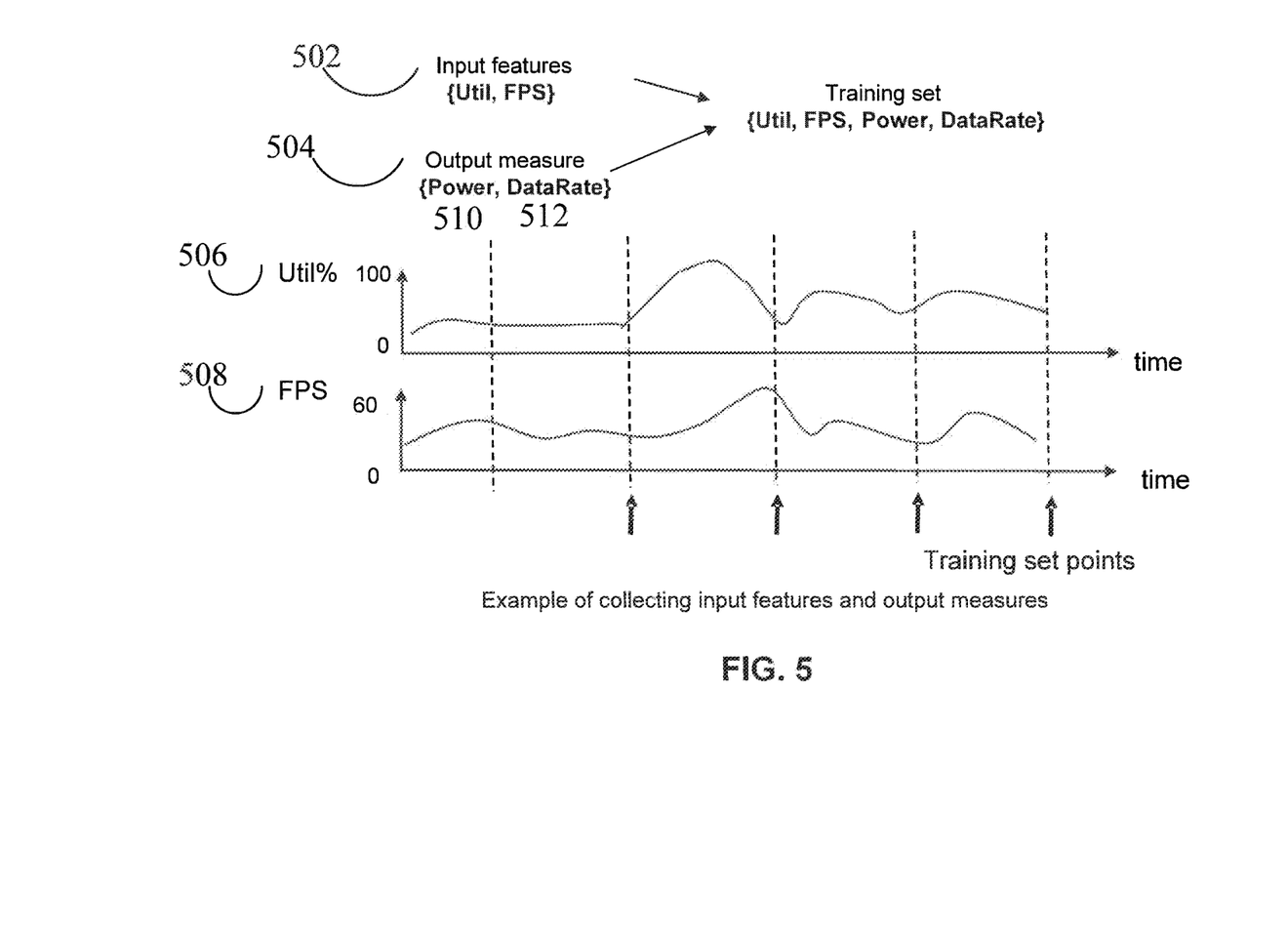
FIG. 5 depicts an example of collecting input features and output measures, according to an embodiment of the present disclosure.

FIG. 5 depicts an example of collecting input features and output measures, according to an embodiment of the present disclosure. In the example illustrated in FIG. 5, input features 502 of a captured application may include a utilization or utilization rate 506, which can be defined as active_period/total_period, where total_period includes the active_period and idle_period. For example, if utilization 506 is 90%, an active period dominates, while an idle period dominates if the utilization 506 is 10%.

In an embodiment, input features 502 may include Frame Per Second (FPS) 508. For example, in a video playback application, the FPS 508 may be 10 or 60 FPS, while 60 FPS corresponds to high quality video playback.

In an embodiment, the output measurement 504 may include power consumption 510 of the secondary platform and data rate 512 between the primary and secondary platforms. For example, a high 90% utilization 506 corresponds to a high power consumption 510. Likewise, a high 60 FPS 508 corresponds to a high data rate 512. Accordingly, input features 502 may determine the output measures 504, in term of the table matrix (see FIG. 6) defined by the machine learning algorithm described below. One skilled in the relevant arts will appreciate that additional parameters may be used to define input features and output measures.

At stage 308, power consumption of the secondary platform with an expected performance level is predicted for a new application running on the secondary platform based on the training set. For example, power predicting module 217 predicts power consumption for a new application running on the secondary platform. Based on this prediction, an optimal power management policy may be deduced that minimizes the overall power consumption of the primary and secondary platforms. According to an embodiment, stage 308 may further include a training period 404 and a classification period 406, as illustrated in FIG. 4.

According to an embodiment, in the training period 404, based on the training set collected on stage 306, a machine learning algorithm is used to recognize power consumption patterns with an expected performance level. One skilled in the relevant arts will appreciate that any machine learning approaches such as decision tree learning, Bayesian network, and clustering analysis can be utilized to make the predictions.

FIG. 6 depicts a classification of the input features and output measures, according to another embodiment of the present disclosure. In the training table illustrated in FIG. 6, input features are collected during a training period, with the corresponding output measures listed therein as well. For example, utilization rate 602 and FPS 604 are classified or categorized into low, med or high categories respectively. For example, a low utilization can be defined as 0-30%; a medium utilization is 31-60%; and a high utilization is above 60%.

In another example, data rate between the first and second platforms can be defined in ranges such as: D1=[10 20] mbps, while D2=[20 40] and D3=[40 60]. In still another example, power consumption of the primary platform P1= [140 160] mW; P2=[160 180] and P3=[180 200]. One skilled in the relevant arts will appreciate that the examples described above are for illustration, not for limitation purpose.

Notably, the same input features may generate different output measures which fall into different categories. As shown in FIG. 6, although entries 610 D2 and 612 D3 have same categories of utilization rate, FPS and power consumption, their corresponding data rate ranges may differ. For example, entry 610 may correspond to HD video which has a utilization of 77%, while entry 612 may correspond to Standard video which has a utilization of 63%. Although these two entries may have similar ranges of utilization rate, FPS or power consumption of the primary platform, the data rates D2 or D3 may still fall within different ranges.

In one embodiment, the categorization of the input features and output measure into various classes defined with low, medium and high, or P1, P2 and P3 class labels for the corresponding attributes of utilization rate, FPS or power consumption.

In one embodiment, based on the training table built during the training period, for a given new application, the data rate between the primary and secondary platforms may be projected. The power consumption of the secondary platform may be a function of the data rate. According to another embodiment, based on the classification, the upcoming power consumption can be predicated for the given performance level, thus the optimal operating frequency for the primary and secondary platform.

According to an embodiment of the present disclosure, when a new task or application is given, the upcoming power consumption and performance level may be predicted based on the classification noted above. Specifically, given the input features, the most likely output class label of output measures may be predicted. In an embodiment, a Maximum A Posteriori (MAP) class may be identified, by assigning the maximum a posteriori class given data x and the prior class assignment to y and maximizing the posterior probability of assigning class 1 to out feature y.

According an embodiment, in the classification period 406, an input feature y of the application running on the secondary platform can be classified into class 1 based on the equation:

$$y_{MAP} = \arg\max_{l} Prob(y = l | x_1, x_2, \ldots, x_n)$$
$$= \arg\max_{l} \frac{Prob(x_1, x_2, \ldots, x_n | y = l) \cdot Prob(y = l)}{Prob(x_1, x_2, \ldots, x_n)}$$
$$= \arg\max_{l} Prob(y = l) \cdot \prod_{j=1}^{l} Prob(x_j | y = l)$$

where x1 is a utilization rate, x2 is a frame frequency of the secondary platform, and $y_{map}$ is a maximal probability of assigning class 1 to an output feature y.

Further, given the input feature $x_j$, the possibility of assigning an output feature y to class 1 may be calculated as:

$$Prob(x_j \mid y = l) = \frac{freq(x_j, y = l) + \lambda}{freq(y = l) + \lambda n}$$

where λ is a smoothing constant (>0), and n is the number of different attributes of input feature x that have been observed.

For example, assuming input feature [Util, FPS]=[Med Med]=[x1, x2], the power consumption of the secondary platform may be estimated via the following equation:

$$Prob(x2 = Med \mid y = P3) = \frac{freq(x2 = Med, y = P3) + \lambda}{freq(y = P3) + \lambda n} = \frac{0+1}{2+1 \cdot 3} = \frac{1}{5}$$

Thus, calculation of the probability of each hypothesis below generates the following results:

(1) For the hypothesis y=P3, Prob(y=P3)*Prob(x1=Med, x2=Med|y=P3)=⅜*½*⅕=0.038; since Prob(x1=Med|y=P3)=½, Prob(x2=Med|y=P3)=⅕

(2) For the hypothesis y=P2, Prob(y=P2)*Prob(x1=Med, x2=Med|y=P2)=4/8*4/4*¾=0.375; since Prob(x1=Med|y=P2)=4/4, Prob(x2=Med|y=P2)=¾

(3) For the hypothesis y=P1, Prob(y=P1)*Prob(x1=Med, x2=Med|y=P1)=⅖*½*½=0.150, since Prob(x1=Med|y=P1)=½, Prob(x2=Med|y=P1)=½

Accordingly, higher value for the hypothesis y=P2, which corresponds to a prediction of power consumption as P2= [160 180] mW.

At stage 310, a power management policy may be adjusted with an optimal clock frequency of the secondary platform that minimizes a total power consumption of the primary platform and the secondary platform. A power management policy may include several power management features that a host or platform provides to adjust the trade-off between performance and power consumption. For example, policy adjusting module 219 may adjust the power management policy to minimize the total power consumption. Stage 310 may correspond to the power control period 408 as illustrated in FIG. 4.

In an embodiment, the secondary platform may change the clock frequency. For example, if high performance is needed for the secondary platform, the clock frequency may be changed from 100 MHz to 300 MHz. Alternatively, if low performance is needed for the secondary platform, the clock frequency may be changed from 300 MHz to 100 MHz.

In another embodiment, assuming prediction of power consumption Px=[p− p+] and data rate Dy=[d− d+], and power consumption of the secondary platform is estimated as $P\_2^{nd}$=[func(d−) func(d+)]. Thus, the change of FPS is proportional to clock frequency change Freq_new/Freq_current.

For example, if change the clock frequency to 200 MHz from 250 MHz @32 fps, then, expected fps is 32*(200/250) =25 fps, where 32 fps represents 31.3 ms for a frame, and where active_period=17.5 ms when Util=0.56.

In another example, if change clock frequency to 200 MHz from 250 MHz @p−=160 mW, then, expected p− is 160*(200/250)=128 mW.

Accordingly, in an embodiment, power consumption may be scaled based on Freq_new/Freq_current.

Therefore, according to an embodiment of the present disclosure, the power management policy may be adjusted based on:

$$DFS_{new} = \arg\min_{freq1,freq2}(Energy_{primary} + Energy_{secondary})$$

$$= \arg\min_{freq1,freq2}\left[\left(\frac{p_- \cdot t_p + p_+ \cdot t_p}{2}\right) + \left(\frac{func(d_-) \cdot t_s + func(d_+) \cdot t_s}{2}\right)\right]$$

such that $FPS_{secondary}$>user_defined wherein freq1 is a clock frequency of the primary platform; freq2 is a clock frequency of the secondary platform; $t_p$ is an active period of the primary platform; $t_s$ is an active period of the secondary platform, assuming prediction of a power consumption range Px=[p−, p+] and a data rate range Dy=[d−, d+] and the power consumption of the secondary platform is estimated as $P\_2^{nd}$=[func(d−), func(d+)].

One skilled in the relevant arts will appreciate that stage 310 is optional and the present disclosure may be practiced without the necessity to adjust the power management policy. Furthermore, one skilled in the relevant arts will appreciate that the aforementioned stages described in FIG. 3 could be executed in different combinations and with varying degrees of parallelism.

It would be apparent to one of skill in the art that the present disclosure, as described above, can be implemented in many different embodiments of software, hardware, firmware, and/or the entities illustrated in the figures. Any actual software code with the specialized control of hardware to implement the present disclosure is not limiting of the present disclosure. Thus, the operational behavior of the present disclosure will be described with the understanding that modifications and variations of the embodiments are possible, and within the scope and spirit of the present disclosure.

IV. Example Computer Implementation

Figure 7:
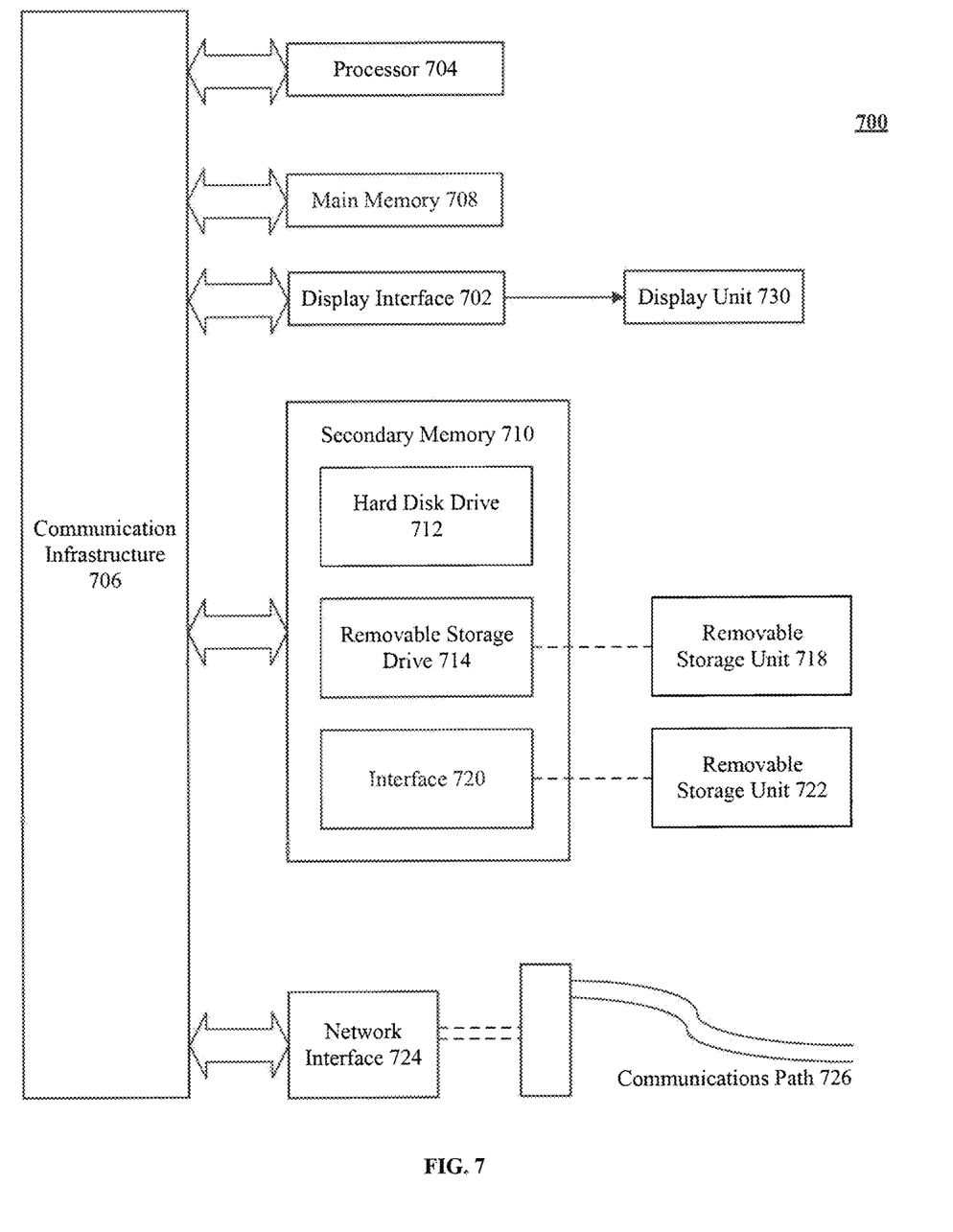
FIG. 7 illustrates an example computer system in which the present disclosure, or portions thereof, can be implemented as computer-readable code.

Various aspects of the present disclosure can be implemented by software, firmware, hardware, or a combination thereof. FIG. 7 illustrates an example computer system 700 in which the present disclosure, or portions thereof, can be implemented as computer-readable code. For example, system 200 in FIG. 2 and the processes in FIGS. 3 and 4 can be implemented in system 700. Various embodiments of the disclosure are described in terms of this example computer system 700. After reading this description, it will become apparent to a person skilled in the relevant art how to implement the embodiments using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 715 in a well-known manner. Removable storage unit 715 may comprise a USB flash data storage, magnetic tape, optical disk, etc.

that is read by and written to by removable storage drive 714. As will be appreciated by persons skilled in the relevant art(s), removable storage unit 715 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units such as removable storage unit 722 and interfaces such as interface 720 that allow software and data to be transferred from the removable storage unit 722 to computer system 700.

Computer system 700 may also include a communications interface 724.

Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals that may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 715, removable storage unit 722, and a hard disk installed in hard disk drive 712. Signals carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present disclosure as discussed herein. In particular, the computer programs, when executed, enable processor 704 to implement the processes of the present disclosure, such as the steps in the methods illustrated by flowcharts 200 of FIG. 2 and 300 of FIG. 3, discussed above. Accordingly, such computer programs represent controllers of the computer system 700. Where the disclosure is implemented using software, the software may be stored in a computer program product and loaded into computer system 700 using removable storage drive 714, interface 720, hard drive 712 or communications interface 724.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

Conclusion

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A power management system on a first platform, comprising:
   a memory that stores instructions; and
   a processor configured to execute the instructions, the instructions, when executed by the processor, configuring the processor to:
   capture a first application running on a second platform communicatively coupled to the first platform,
   collect an input feature of the first application and an output measure of the first application reflecting a characteristic of the first application as a training set for the first application, wherein the input feature and the output measure are categorized into a low, medium or high category,
   predict power consumption of the second platform with an expected performance level for a second application running on the second platform based on a combination of the category for the input feature and the category for the output measure collected as the training set for the first application, and adjust a power management policy that reduces the power consumption of the second platform based on the predicted power consumption for the second application running on the second platform.

2. The power management system of claim 1, wherein the second platform comprises:
   a wearable device.

3. The power management system of claim 1, wherein the first application comprises:
   a video playback application;
   a voice activation application; or
   a web browser application.

4. The power management system of claim 1, wherein the input feature of the first application comprises:
   a utilization rate of the second platform representing a ratio of an active period and a total period, the total period being a combination of the active period and an idle period; and
   wherein the output measure of the first application comprises:
      a workload of the first application running on the second platform;
      the power consumption of the second platform; or
      a data rate of the second platform.

5. The power management system of claim 1, wherein the training set comprises:
   a utilization rate of the second platform;
   a frame frequency of the second platform;
   a power consumption of the second platform; or
   a data rate of the second platform.

6. The power management system of claim 1, wherein the instructions, when executed by the processor, further configure the processor to:
   categorize the input feature of the first application into an input feature category from among the low, medium, or high category;
   collect an output feature category from among the low, medium, or high category corresponding to the input feature category as the output measure of the first application; and
   predict the power consumption of the second platform with an expected performance level for the second application running on the second platform based on the categorized input feature and output measure.

7. The power management system of claim 1, wherein the instructions, when executed by the processor, configure the processor to:
   adjust the power management policy with a clock frequency of the second platform that reduces the power consumption of the second platform.

8. A method for power management, comprising:
   capturing, by a processor operating on a first platform, a first application running on a second platform communicatively coupled to the first platform,
   collecting an input feature of the first application and an output measure of the first application reflecting a characteristic of the first application as a training set for the first application, wherein the input feature and the output feature measure are categorized into a low, medium or high category,
   predicting power consumption of the second platform with an expected performance level for a second application running on the second platform based on a combination of the category for the input feature and the category for the output measure collected as the training set for the first application, and adjusting a power management policy that reduces the power consumption of the second platform based on the predicted power consumption for the second application running on the second platform.

9. The method of claim 8, wherein the second platform comprises:
   a wearable device.

10. The method of claim 8, wherein the first application comprises:
    a video playback application;
    a voice activation application; or
    a web browser application.

11. The method of claim 8, wherein the input feature of the first application comprises:
    a utilization rate of the second platform representing a ratio of an active period and a total period, the total period being a combination of the active period and an idle period; and
    wherein the output measure of the first application comprises:
       a workload of the first application running on the second platform;
       the power consumption of the second platform; or
       a data rate of the second platform.

12. The method of claim 8, wherein the training set comprises:
    a utilization rate of the second platform;
    a frame frequency of the second platform;
    a power consumption of the second platform; or
    a data rate of the second platform.

13. The method of claim 8, further comprising:
    categorizing the input feature of the first application into an input feature category from among the low, medium, or high category; and
    collecting an output feature category from among the low, medium, or high category corresponding to the input feature category as the output measure of the first application; and
    predicting the power consumption of the second platform with an expected performance level for the second application running on the second platform based on the categorized input feature and output measure.

14. The method of claim 8, wherein the adjusting comprises:
    adjusting the power management policy with a clock frequency of the second platform that reduces the power consumption of the second platform.

15. A power management system on a first platform, comprising:
    a memory that stores instructions; and
    a processor configured to execute the instructions, the instructions, when executed by the processor, configuring the processor to:
       capture a first application running on a second platform that is communicatively coupled to the first platform,
       categorize an input feature of the first application into an input feature category from among a plurality of input feature categories,
       collect an output feature category from among a plurality of output feature categories corresponding to the input feature category as an output measure of the first application, wherein the input feature and the output measure are categorized into a low, medium, or high category,
       predict power consumption of the second platform with an expected performance level for a second application running on the second platform based on a combination of the category for the input feature and the category for the output measure collected for the first application, and adjust a power management policy that reduces the power consumption of the second platform based on the predicted power consumption for the second application running on the second platform.

16. The power management system of claim 15, wherein the second platform comprises:
   a wearable device.

17. The power management system of claim 15, wherein the first application comprises:
   a video playback application;
   a voice activation application; or
   a web browser application.

18. The power management system of claim 15, wherein the input feature of the first application comprises:
   a utilization rate of the second platform representing a ratio of an active period and a total period, the total period being a combination of the active period and an idle period; and wherein the output measure of the first application comprises:
   a workload of the first application running on the second platform;
   the power consumption of the second platform; or
   a data rate of the second platform.

19. The power management system of claim 15, wherein the training set comprises:
   a utilization rate of the second platform;
   a frame frequency of the second platform;
   a power consumption of the second platform; or
   a data rate of the second platform.

20. The power management system of claim 15, wherein the instructions, when executed by the processor, configure the processor to:
   adjust the power management policy with a clock frequency of the second platform that reduces the power consumption of the second platform.

* * * * *